United States Patent [19]

Bennett

[11] Patent Number: 5,475,804
[45] Date of Patent: Dec. 12, 1995

[54] ELECTRONICS CIRCUIT GRAPHICS SYMBOL SCALING METHOD

[75] Inventor: Ralph C. Bennett, Scottsdale, Ariz.

[73] Assignee: Motorola, Inc., Schaumburg, Ill.

[21] Appl. No.: 77,847

[22] Filed: Jun. 18, 1993

[51] Int. Cl.⁶ .................................................. G06T 3/00
[52] U.S. Cl. .................... 395/139; 395/133; 395/919; 395/921; 364/491
[58] Field of Search .................... 364/480–491; 395/919–921, 133–139, 140, 141

[56] References Cited

U.S. PATENT DOCUMENTS

| | | | |
|---|---|---|---|
| 4,651,284 | 3/1987 | Watanabe et al. | 364/491 |
| 5,025,325 | 6/1991 | Hudson | 358/447 |
| 5,031,111 | 7/1991 | Chao et al. | 364/491 |
| 5,050,091 | 9/1991 | Rubin | 364/488 |
| 5,092,780 | 3/1992 | Vlach | 434/433 |
| 5,197,120 | 3/1993 | Saxton et al. | 395/139 |
| 5,258,919 | 11/1993 | Yamanouchi et al. | 364/489 |
| 5,319,743 | 6/1994 | Dutta et al. | 395/133 |

Primary Examiner—Almis R. Jankus
Attorney, Agent, or Firm—Frank J. Bogacz

[57] ABSTRACT

A method for scaling (reducing or enlarging) electronic device symbols operates on an input file (ie. body file) of information in precoded characteristics representing the electronic device symbol. The characteristic has a plurality of parameters describing it. The method, performed by a computer, first parses a plurality of parameters associated with the characteristic. Certain parameters are selected and scaled by the method. Lastly, the scaled parameters are reassembled along with the non-scaled parameters in the same characteristic and replaced in the body file of information.

21 Claims, 11 Drawing Sheets

ELECTRONICS CIRCUIT GRAPHICS SYMBOL SCALING METHOD

BACKGROUND OF THE INVENTION

The present invention pertains to graphic display systems and more particularly to a method for scaling preformatted graphical symbols to various sizes.

Computers such as work stations are providing valuable tools to those involved in the design of electrical circuits. Such work stations allow a circuit designer to call parts from a database, to interconnect these parts graphically and to provide a visual display of the interconnected circuitry. Such work stations have extensive libraries of electrical components such as integrated circuits, transistors, resistors, capacitors and inductors, for examples.

The electronic circuit designer selects components from databases associated with these work stations and interconnects them via connecting leads or wire. The interconnected electronic circuitry is displayed upon a high resolution cathode ray tube (CRT). The electrical components are stored in the work station's database as sets of commands or parameters describing the shape and interconnect ability of various components. For example, a capacitor is a two port device shown as having two parallel separated surfaces. The work station would be required to store the identities of the two parallel surfaces and of a lead extending from each of the surfaces to which external connections can be made. As another example, an integrated circuit may be drawn as a square or rectangular box with a number of leads or interconnections thereto. The work station data base is required to store the dimensions of the box, that is the four sides comprising the rectangle or square, as well as the number and position of each of the leads extending from that integrated circuit.

The line segments comprising the capacitor and integrated circuit have a particular size and coordinate location associated with each of the electronic devices.

It is advantageous to show portions of the electronic circuit in greater detail or to show large circuits all on one schematic drawing. Furthermore, it is advantageous to convert the electronic symbols of a work station to conform with the symbol sizes and shapes of another schematic drawing. In addition, it is particularly advantageous to be able to alter the size of whole libraries or data bases of electrical parts.

SUMMARY OF THE INVENTION

In accordance with the present invention, a novel method for graphics symbol scaling is shown. A method for graphics scaling of device symbols on a computer provides a body file of information including at least one characteristic of a device symbol. Each characteristic includes a plurality of parameters describing the characteristic. The method then parses, under control of the computer, the plurality of parameters. Next, the computer selects certain ones of the plurality of parameters and scales the selected ones according to an input scaling factor. Lastly, the parameters are reassembled by the computer into the corresponding body file of information which included at least one characteristic. The characteristic includes the plurality of parameters with the scaled certain ones replacing the selected certain parameters.

DESCRIPTION OF THE PREFEFFED EMBODIMENT

Figure 1:
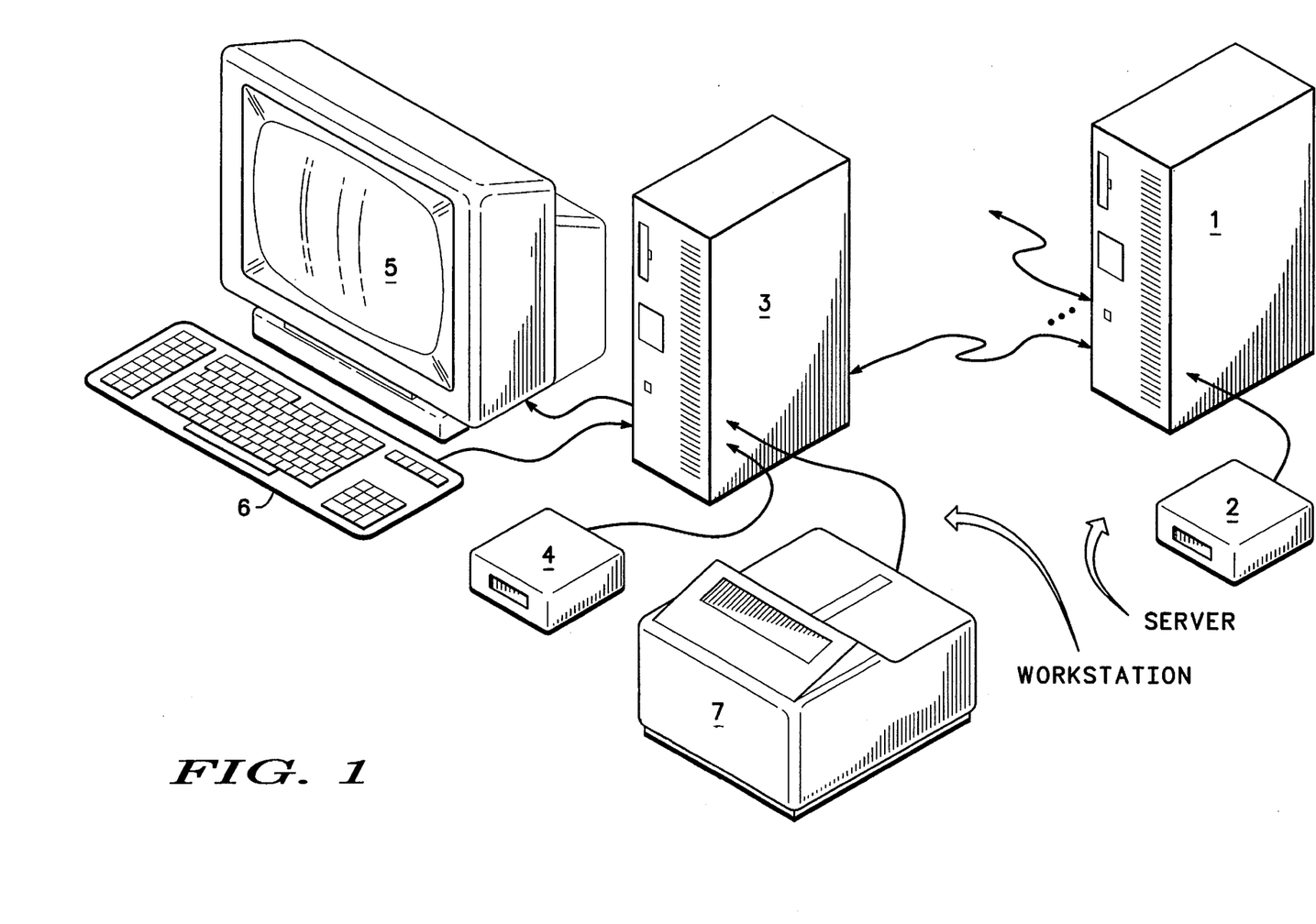
FIG. 1 is a block diagram of a computer arrangement for facilitating use of the graphics symbol scaling method shown herein.

Referring to FIG. 1, a block diagram of a computer system for implementing a graphics symbol scaling method is shown. Server 1 is a computer which provides for facilitating the operation of software symbol programs such as those manufactured by Cadence Design Systems and Valid Logic. Former Company, Valid Logic Systems, Incorporated, 2820 Orchard Parkway, San Jose, Calif. 95134, present by a single company, Cadence Design Systems, Inc., 555 River Oaks Parkway, San Jose, Calif. 95134, USA. Server 1 may be implemented with a computer such as IBM RS6000/530. The graphics symbol software which is provided by Cadence or Valid Logic may be the GED concept schematic part number FET5522 or the concept software (full version) part number FET5520. Server 1 is coupled to hard disk 2. Server 1 is primarily for the purpose of serving licenses for software execution on the client workstation. Hard disk 2 provides for storage of databases and operating software.

Server 1 is coupled to computer 3 as well as to other computers which are not shown. Computer 3 will download from server 1 the electronic parts libraries and some software necessary to perform the graphic symbol scaling method shown herein. Computer 3 may be implemented with IBM RS6000/320 computer. Computer 3 is coupled to hard disk 4 which stores data and programs necessary to perform the graphics symbol scaling method herein. Computer 3 is also coupled to monitor 5 which may be implemented with an IBM5081 monitor, a 19 inch color monitor. Further, computer 3 is coupled to keyboard 6 and to printer 7. The output of the graphic symbol scaling method may be displayed upon monitor 5 or upon printer 7. The operating system for computer 3 may be implemented with AIX 3.2.2.

Figure 2A:
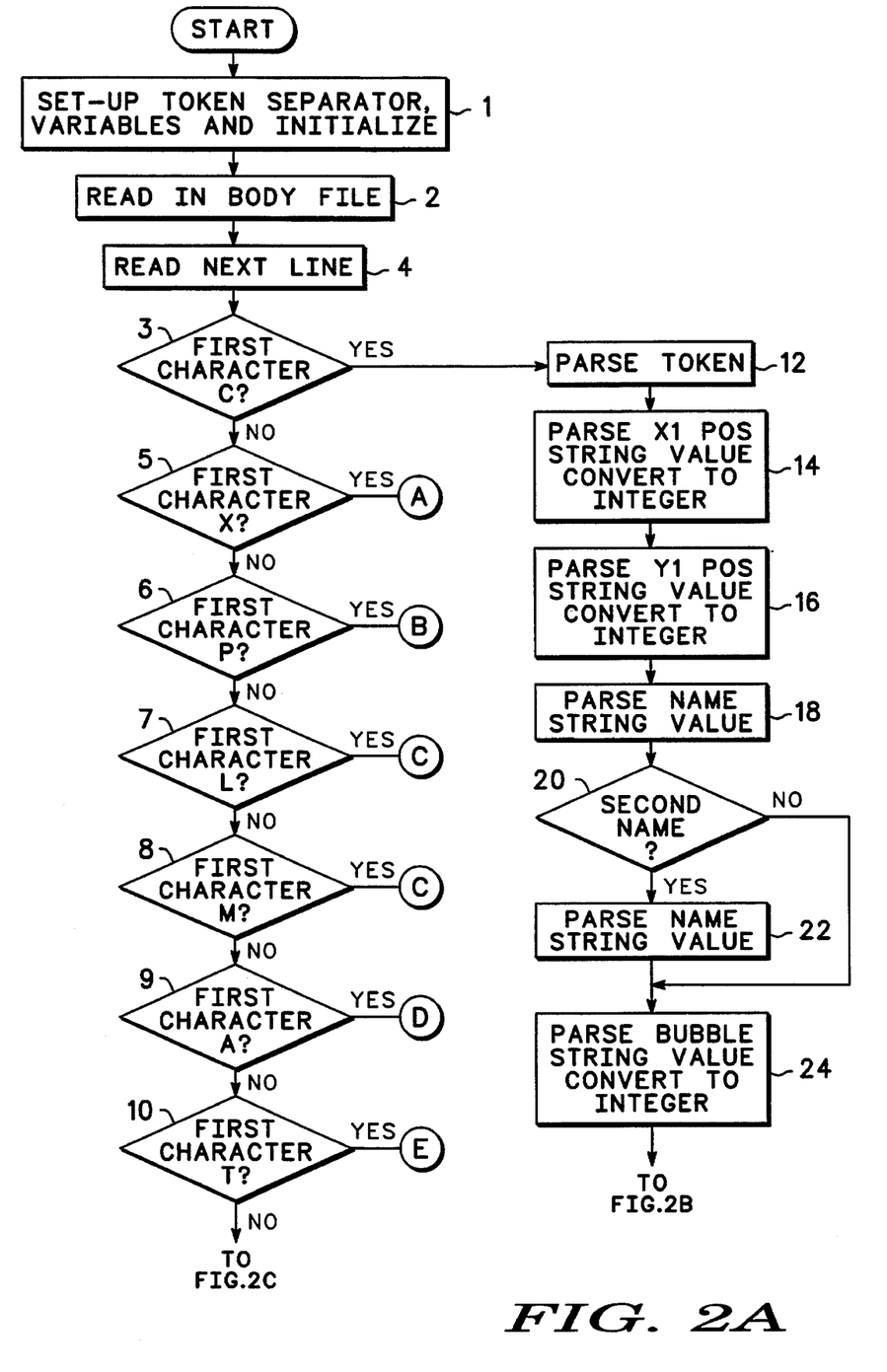
FIGS. 2A–2C are a flow chart of a graphical symbol scaling method in accordance with the present invention.
Figure 2B:
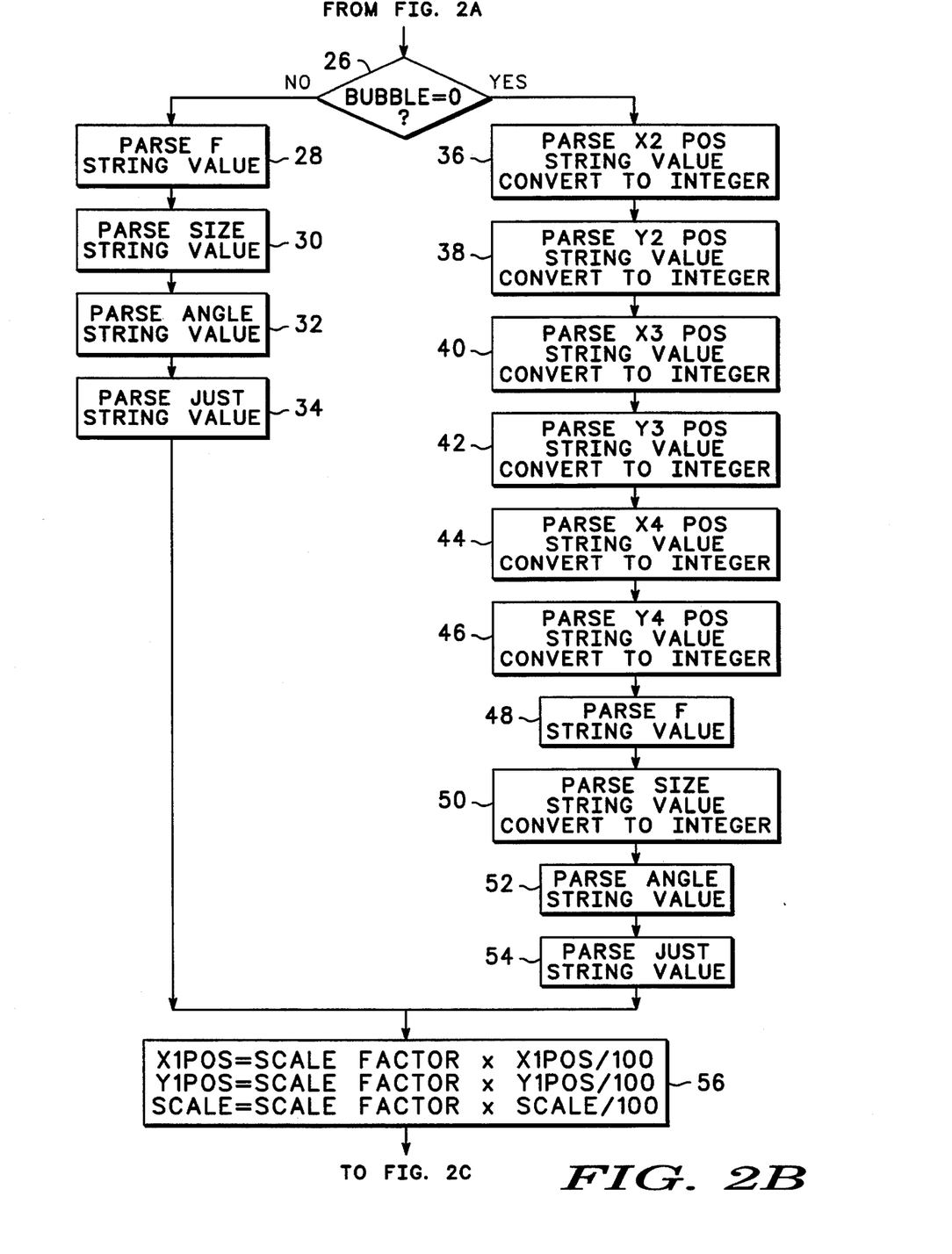
Figure 2C:
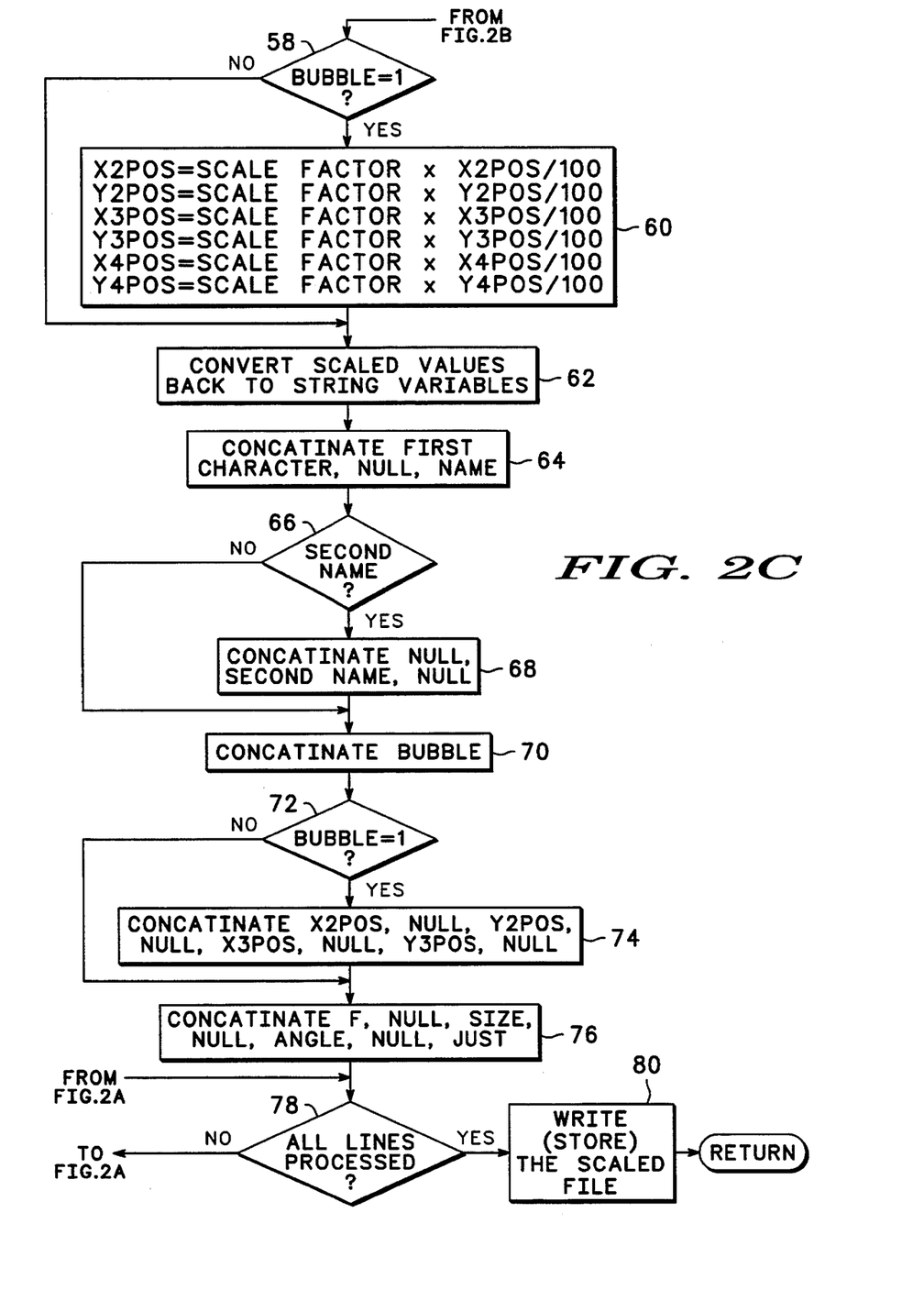
Figures 9A, 9B, 9C, 9D:
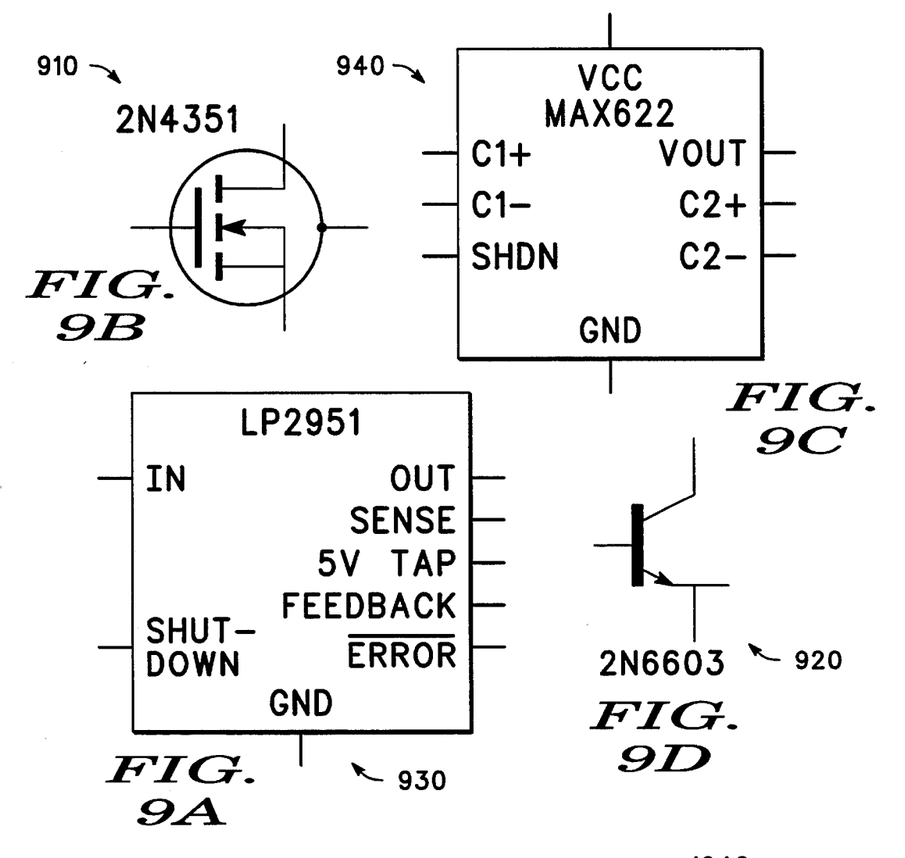
FIGS. 9A–9D are schematic diagrams of various electrical components drawn at full size.
Figure 10A:
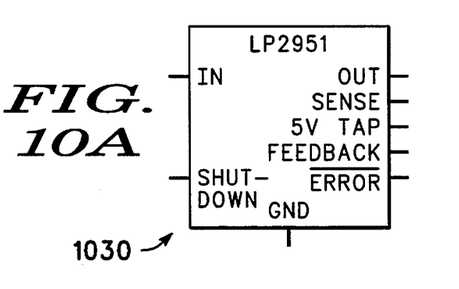
FIGS. 10A–10D are schematic diagrams of the same electrical components of FIG. 9 drawn at one-quarter of full size.
Figure 10B:
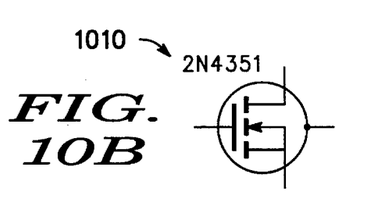
Figure 10C:
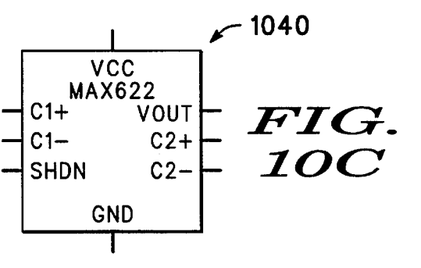
Figure 10D:
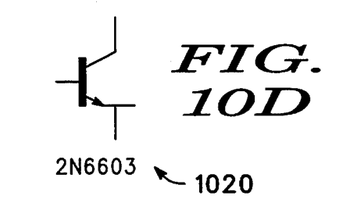

FIG. 2 depicts a portion of the flow diagram for a graphics symbol scaling method in accordance with the present invention. When the method is invoked and the start block is entered next, Block 1 sets up the token separator and variables and initialization. The input variables include the size to make the graphic symbols, that is, larger, smaller and to what degree, 10% smaller or 100% larger, for example. Each electronic symbol device is composed of a number of descriptors which describe the overall device. For example, field effect transistor 910 shown in FIG. 9 is composed of the descriptor statements shown in Table 1 below. Each line of parameters in Table 1 represents one aspect of the electronic symbol 910. Block 2 reads in the body (input) file for the electronic symbol to be scaled. Then Block 4 reads the next line description or characteristic of the electronic symbol and transfers control to Block 3.

Next, Block 3 determines where the first character of a line is a letter "C". If the first character is not a C, control is transferred from Block 3 to Blocks 5 through 10 for further analysis of the first character. If the first character is a C, Block 3 transfers control to Block 12 via the Y path and the particular token is parsed. Next Block 14 parses the X1 coordinate position string value and converts the value to an integer. All the input symbol device lists of the Cadence Design Systems Inc. and Valid Logic Concept or GED programs are in ASCII form. The method converts these numbers in ASCII format to an integer format before scaling. Next, the Y1 coordinate position is parsed and converted to an integer value, Block 16. Thus the X and Y coordinates of the connection for the electronic symbol device have been obtained from the appropriate place in the character string and converted to integer form.

Next, the name field is parsed from the character string, Block 18. Next Block 20 determines whether there is a second name. If there is a second name a second name is parsed from the character string by Block 22. If there is no second name then Block 20 transfers control to Block 24.

Next, the method determines whether the connection has a bubble associated with it, Block 26. A bubble on a connection indicates an inverted signal. For an example of a bubble or an inverted signal, refer to Item 941 of Integrated Circuit 940 shown in FIG. 9. If a bubble is not to be included in this connection, Block 26 transfers control to Block 28 via the no-path. Block 28 parses the F parameter from the characteristic string. The value of the "F" field indicates whether the bubble is to be open or filled; a 0 indicates open and 1 indicates filled. Next, Block 30 parses the size field of the character string. The "size" field indicates the size of the name string. Next, Block 32 parses the angle field of the character string. The "angle" field of the character string indicates the angle of the name string attached to the connections. The values of the angle string correspond to 0, 90, 180 or 270 degrees. Lastly, Block 34 parses the "justification" field of the character string. The "justification" field indicates whether the text is to be left, right or center justified. Block 34 then transfers control to Block 56.

If there is a bubble in the connection, Block 26 transfers control to Block 36 via the Y path. Block 36 parses the X2 coordinate position and converts the value to an integer. Recall that the input parameters are in ASCII and must be converted to an integer form before modification. Block 38 parses Y2 coordinate position and converts the value to an integer. Similarly, Blocks 40 and 42 parsed the X3 and Y3 positions of the bubble and convert these values to integer form. Next, Blocks 44 and 46 parse the X4 and Y4 coordinate positions and convert these numbers to integers. These numbers indicate the positioning of the bubble. Block 48 parses the F value which is a 0 for an open bubble and a 1 for a filled bubble. Item 941 of FIG. 9 is an open bubble. Block 50 parses the size value and converts it to integer form. Block 52 parses the angle value. Lastly Block 54 parses the justification string value, that is left justified, right justified or center justified.

Next, Block 56 converts the values of X1 and Y1 coordinate positions by multiplying each one times the scaling factor and dividing by 100. That is, if the drawing was to be enlarged 5 times the scaling factor would be 500 divided by 100 would be 5 times each of the X1, Y1 and scale parameters. Next, Block 58 determines whether the bubble field value is equal to 1. If it is, that indicates that the bubble is required in the drawing; if not equal to one, the bubble is not required and Block 58 transfers control to Block 62 via the in-path. If the bubble is required, Block 58 transfers control to Block 60 via the Y-path. Block 60 then scales each of the X and Y coordinates (X2,Y2,X3,Y3,X4,Y4) to be multiplied by the scale factor and divided by 100. This scales all the sizes and locations associated with the placement of the bubble along with the connection specified for this parameter of the electronic device.

Block 62 converts all these scaled values back to ASCII string variables. That is, the integer forms are converted back to ASCII values. Block 64 begins concatenating the variables back into a string form. The token (first character) a null and the first name are concatenated by Block 64. Block 66 determines whether there is a second name field. If there is no second name field, Block 66 transfers control to Block 70. If there is a second name field, Block 66 transfers control to Block 68. Block 68 concatenates another null, the second name and another null and transfers control to Block 70.

Block 70 concatenates the bubble field indicating whether a bubble is present at the particular connection. Next, Block 72 determines whether the bubble field indicates that a bubble is required. If it is required, Block 72 transfers control to Block 74 via the Y-path and Block 74 concatenates the X2 position, a null, Y2 position, a null, the X3 position, a null, and the Y3 position followed by a null. Next, Block 76 concatenates the F field followed by a null, followed by the size field, followed by a null, the angle field followed by a null and the justification field. If a bubble was not specified, control is transferred from Block 72 to Block 76 via the N-path for processing. Block 78 tests whether all lines (characteristics) of the body file have been processed. If not, Block 78 transfers control to Block 4 to read the next line. If all lines have been completed, Block 78 transfers control to Block 80 via the Y-path which writes the file to a storage such as hard disk, for example medium (stores the file) and then enters the return block.

As can be seen from the above, the symbol scaling method parses fields of a particular electronic component description removing only those fields which need scaling modification. Next, the method scales only those factors requiring scaling. Lastly, the method reformats the data structure for the particular electronic component or part thereof and restores the electronic part description in the part library. This arrangement offers the advantage of rapidly scaling electronic parts or a series of electronic parts in a matter of seconds as opposed to the prior art methodology requiring many tens of minutes to scale graphic symbols.

In FIG. 2 if the token or first character was not a "C", Block 3 transfers control to Block 5 via the N-path. Block 5 tests the token or first character to determine whether it is an "X". If the token is an "X", Block 5 transfers control via the Y-path to connector A of FIG. 3.

A "P" in the token field indicates that the particular definition pertains to a body property of the electronic device. The "X" PIN properties are similar to the body properties "P" except that they start with a "X" rather than a "P" and pertain to the PIN connection instead of the part body. The X PIN properties occur directly after the connections with which they are associated. Connection are referred to by the token "C".

Figure 3:
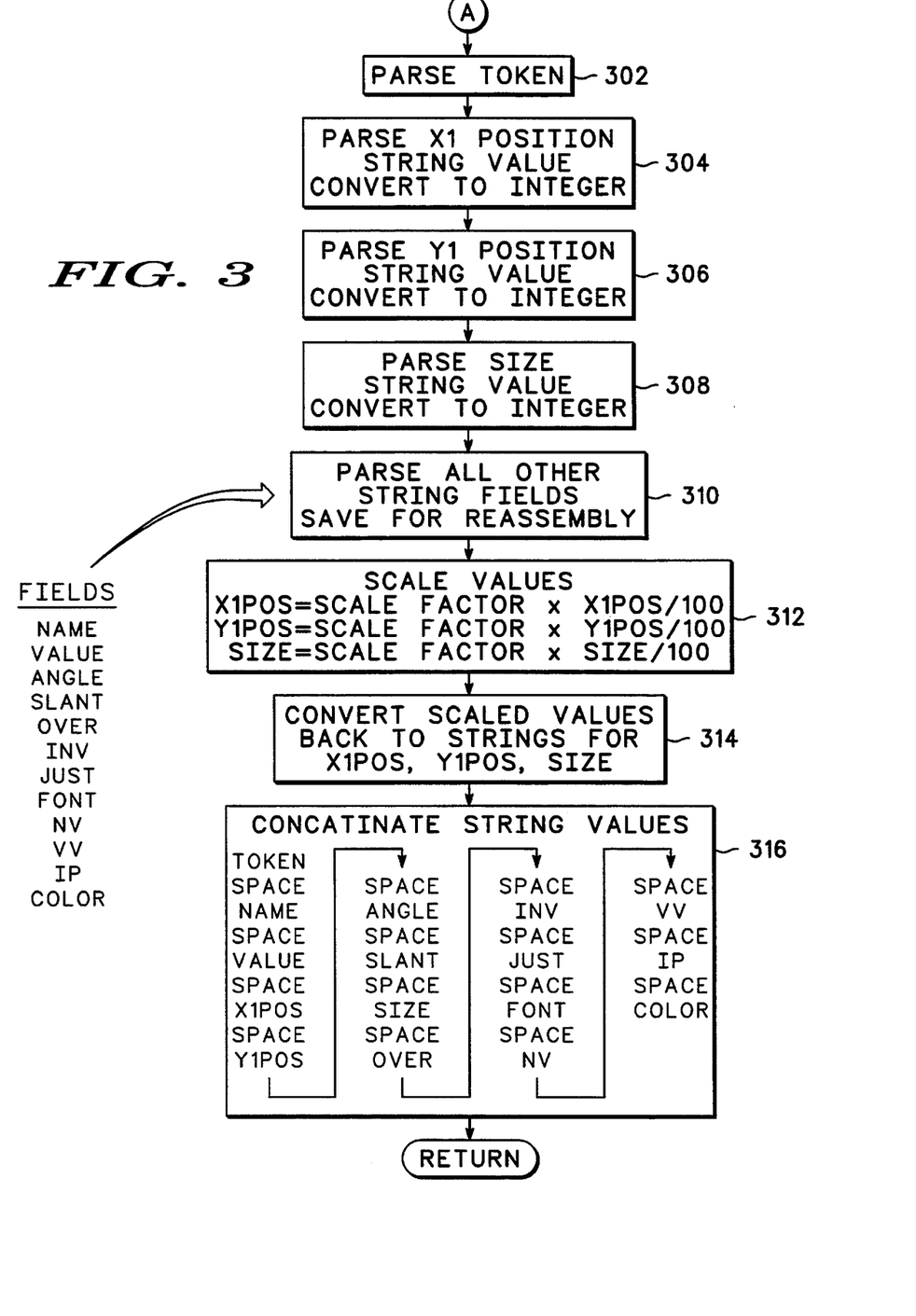
FIG. 3 is a flow chart of a graphics symbol scaling method in accordance with the present invention.

Block 302 parses and stores the token, that is, the character "X". Next, Block 304 parses the X1 coordinate position and converts it to an integer. Similarly, Block 306 parses the Y1 coordinate position and converts it to an integer. Next, Block 308 parses the size field value and converts it to an integer. Block 310 parses all the other variables in the "X" string and stores them for reassembly. These variables include the name, value, angle, slant, the over, the invisibility, the justification, the font, the visibility of the name, the visibility of the value, whether the property is a parameter and the color.

Next, Block 312 scales the X position, the Y position and the size by multiplying each one of these values respectively by the scaling factor and dividing by 100. As previously mentioned, to increase the size 5 times, a scaling factor of 500 is input so that when divided 100 the size of the element is increased 5 times. Non-integer scaling factors are permitted. For example, a scaling factor of 451 may be input which indicates that the symbol is to be enlarged approximately 4½ times. The scaling factor of 451 is multiplied by the value of each parameter to be scaled. Then the result of the multiplication is divided by 100 and any non-integer portion of the division is truncated. Thereby, with a scaling factor of 451 a scaling of approximately 4½ is achieved with truncation of any fractioned part of the resulting multiplication and division. Therefore, the scaling factor may be varied, but some inaccuracy may result. Next, Block 314 converts each of the scaled values (the X coordinate position, the Y coordinate position and the size) to the original ASCII form. Lastly, Block 316 reassembles the string of values representing the "X" property definition as follows:

Then the return Block is entered and control is transferred back to the looping portion of the graphic scaling method.

Referring again to FIG. 2, if the token or first character is not a "X", Block 5 transfers control to Block 6. Block 6 examines the token or first character to determine whether it is the letter "P". If it is a "P", this indicates that it is a body property definition associated with an electronic device. If the token is a "P", control is transferred from Block 6 of FIG. 2 via the Y-path through connector B to FIG. 4. If the first character is a "P", Block 402 parses the token from the character string. Next, Block 404 parses the name from the character string. This is the name of the property which is enclosed in quotation marks. Next, Block 406 determines whether the name is "verified by". If the name is "verified__by", Block 406 transfers control to Block 408. Block 408 parses the initials of the verifier and transfers control to Block 410. Block 410 parses the date of the verification from the character string. If the name is not "verified__by", Block 406 transfers control to Block 412. If the name is not "verified__by", Block 412 parses the value field which is the default value of the property which is enclosed in quotation marks. Block 410 transfers control to Block 414. Block 414 parses the X coordinate position of the property and converts it to an integer form. Next, the Y coordinate position of the property is parsed and converted to integer form, Block 416.

Figure 4:
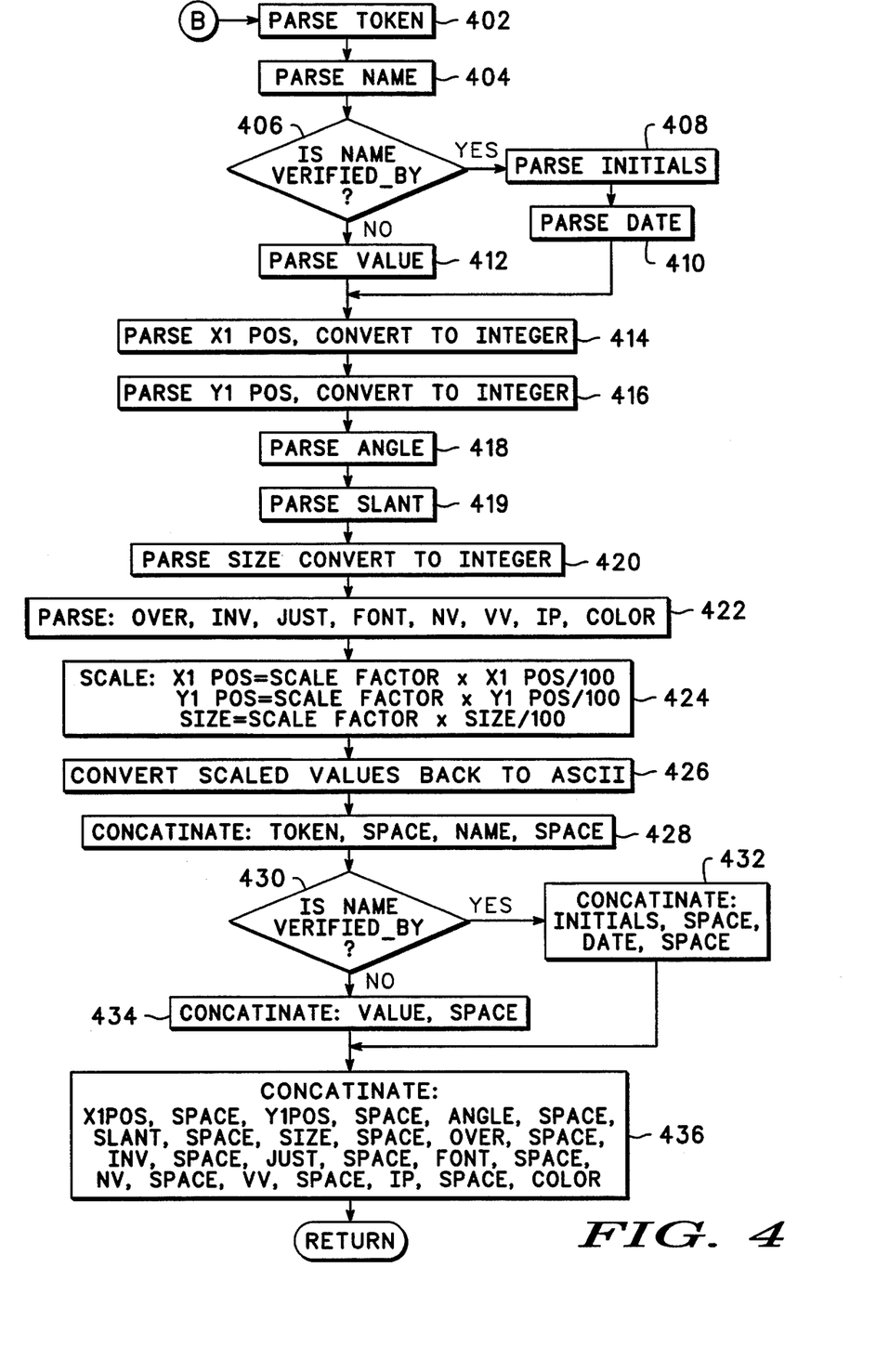
FIG. 4 is a flow chart of a graphical symbol scaling method in accordance with the present invention.

Next, Block 418 parses the angle field. Block 419 parses the slant field. Block 420 parses the size field and converts it to an integer. Lastly, Block 422 parses the over, INV, justify, font, NV, VV, IP and color fields of the string and stores them for reassembly of the string after scaling.

Block 424 scales the X coordinate position, the Y coordinate position, and the size by multiplying the input scaling factor times the X position, Y position coordinates and size divided by 100. As mentioned above, the scaling factors are in terms of 100's. For example, to enlarge things by 5 times, the input scaling factor would be 500. Block 426 converts the scale values back to ASCII. Next, Block 428 begins rebuilding the string of information relating to the electronic device by concatenating the token followed by a space, followed by the name field, followed by a space. Next, Block 430 determines whether the name field was "verified__by". If it is, Block 430 transfers control to Block 432. Block 432 concatenates the person's initials and the date, each followed by a space and transfers control to Block 436. If the name was not "verified__by" Block 430 transfers control to Block 434 via the N-path. Block 434 concatenates the value field of the property which is a default value and is enclosed in quotation marks into the string being reassembled, followed by a space. Block 436 then concatenates the remaining fields of the character string. These fields are the X field, followed by a space, the Y field, followed by a space, the angle field followed by a space, the slant field followed by a space, the size field followed by a space, the over field followed by a field, the INV followed by a space, the justification field followed by a space, the font followed by a space, the NV field followed by a space, the VV field followed by a space, the IP field followed by a space and the color. Control is then returned the looping portion of the symbol scaling program.

If the token or first character was not a "P" Block 6 transfers control to Block 7 via the N-path as shown in FIG. 2. If the first character or token is a letter "L" which is a line, Block 7 transfers control via the Y-path through connector C to FIG. 5.

Figure 5:
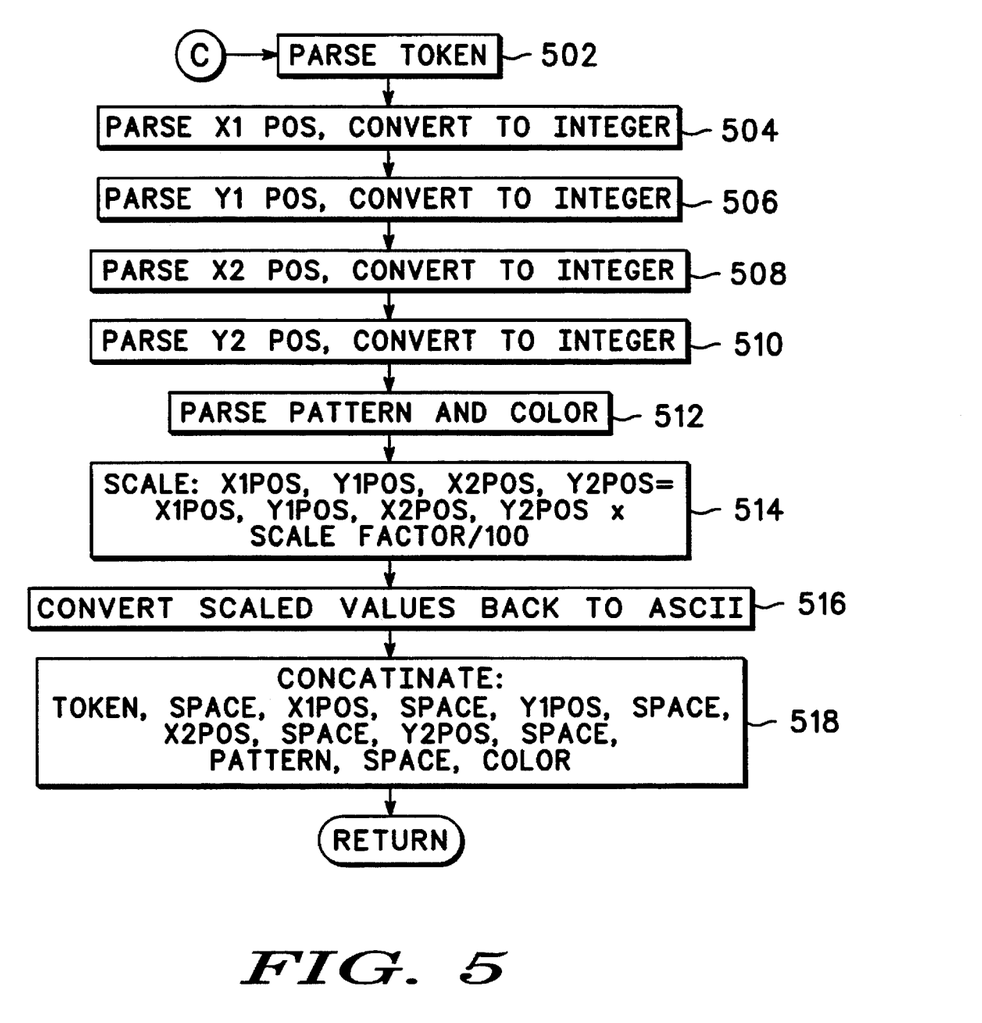
FIG. 5 is a flow chart of a graphical symbol scaling method in accordance with the present invention.

Referring to FIG. 5, Block 502 parses the token from the string of variables representing the line associated with the electronic device. Block 504 parses the X coordinate position of the line and converts it to integer form. Similarly, Block 506 parses the Y coordinate position of the line and converts it to integer form. Block 508 parses the X2 coordinate position of the line and converts it to integer form. The X2 coordinate portion of the line is the other end of the line or in actuality, the line segment. Block 510 parses the Y2 coordinate position of the line and converts it to integer form. Block 512 parses the pattern and color of the line. For example, the pattern may be a solid or dashed line.

Block 514 scales the X1 position, Y1 position, X2 position and Y2 position, each to be multiplied by the input scale factor divided by 100. The scaling factor input is in terms of numbers greater than 100 for increasing the size and numbers less than 100 for reducing the size of the electronic symbol or device. Next, the scaled values of the X1 coordinate position, Y1 coordinate position, X2 coordinate position and Y2 coordinate position are converted back to ASCII form for restructuring the information string associated with the present line. Lastly, Block 518 concatenates the token, followed by a space, the X1 coordinate position followed by a space, the Y1 coordinate position followed by a space, the X2 coordinate position followed by a space, the Y2 coordinate position followed by a space, the pattern followed by a space and the color. The string has now been reassembled and the appropriate values in the string which relate to the scaling operation have been increased or decreased as the case may be. The symbol scaling software then returns to the looping portion of the software.

Referring again to FIG. 2, if the first character or token was not an "L", Block 7 transfers control to Block 8 via the N-path. Block 8 determines whether the token or first character is a "M". If the token in an "M", Block 8 transfers control via the Y-path and connector C to FIG. 5. An "M" is a line or line segment which is thicker than the line or line segment produced by the "L" characteristic. Each of the parameters of the "M" characteristic are the same as found in FIG. 5 which handles the "M" characteristic in the same manner as mentioned above for the "L" characteristic.

Figure 6:
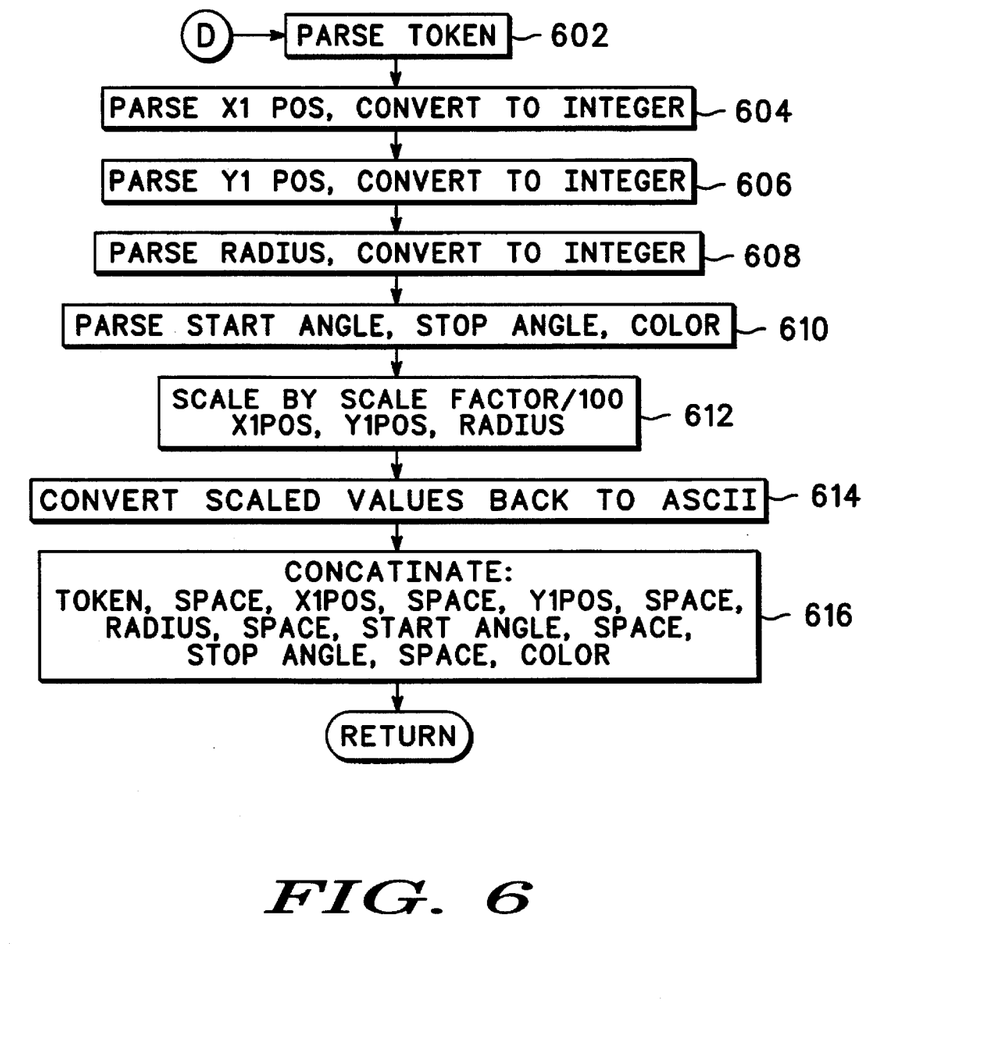
FIG. 6 is a flow chart of a graphical symbol scaling method in accordance with the present invention.

Again referring to FIG. 2, if the token or first character was not an "M", control is transferred from Block 8 to Block 9. Block 9 determines whether the token or first character is an "A". The first character having a value of "A" indicates that an arc or apparent circle is required for the electronic component or device. If the first character is an "A", Block 9 transfers control via the Y-path and connector D to FIG. 6. Referring to FIG. 6, Block 602 parses the token from the character string. Next, the X coordinate position for the location of the center of the arc is parsed from the character string and converted to integer form, Block 604. Block 606 parses the Y coordinate position for the center of the arc and converts it to integer form. Next the radius of the arc is parsed and coverted to integer form, Block 608. Next the start angle, stop angle and color are parsed from the character string, Block 610. It is to be noted that complete circles cannot be drawn. Arcs of slightly less than 360° may be drawn and the arc terminology is therefore applied.

Block 612 scales the X position, Y position and radius integers by multiplying by the scale factor and divide by 100. As mentioned above the scale factors are numbers greater than 100 for enlarging and less than 100 for miniaturizing the electronic component. Block 614 converts the scaled values of the X, Y and radius back to ASCII for insertion into the character string.

Lastly, Block 616 reassembles the arc character string with the scaled components by concatenating the token followed by a space, the X value of the center of the arc, followed by a space, the Y value of the center of the arc, followed by a space, the radius of the arc followed by a space, the start angle of the arc, followed by a space, the stop angle of the arc followed by a space and the color. The method then returns to the next line looping portion of the program.

If the token or first character was not a "A", Block 9 transfers control to Block 10 via the N-path. Block 10 examines the token or first character to determine whether it is a "T" representing text to be enlarged. If the first character is a "T", Block 10 transfers control via the Y-path and connector E to FIG. 7.

Figure 7:
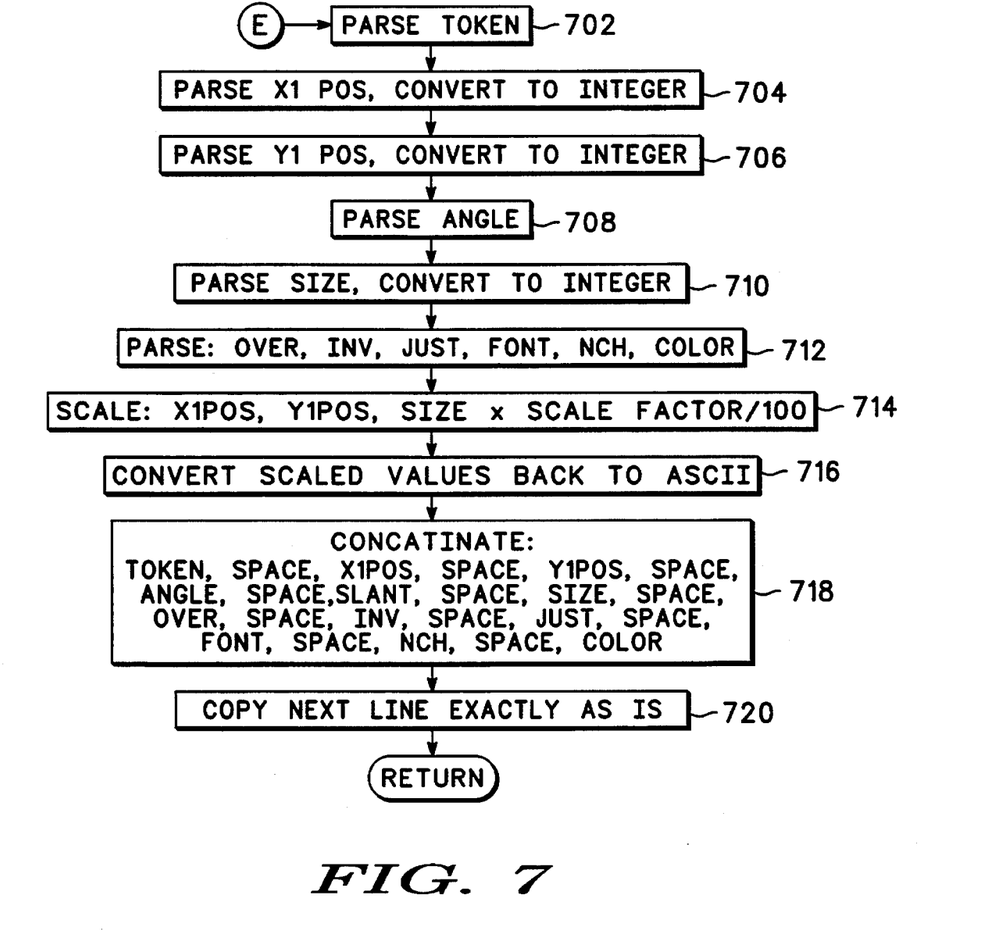
FIG. 7 is a flow chart of a graphical symbol scaling method in accordance with the present invention.

Block 702 parses the token from the character string. The token is the first character, which in this case is a "T". Next the X1 coordinate position of the text is parsed and converted to an integer, Block 704. Similarly, the Y coordinate position of the origin for the character string is parsed and converted to integer form, Block 706. Block 708 parses the angle of the text and the slant characteristic. Block 710 parses the size of the text and converts the size to integer form.

Next, Block 712 parses the over, INV, justification, font, NCH and color fields from the text string. In the definition of the text field, the fields of slant, over, INV and font are not currently implemented, but their placement in the string is dedicated.

Next, the X coordinate position, Y coordinate position and size of the text are scaled by multiplying the scale factor times each of the X, Y and size fields and dividing by 100. The input scale factors are numbers greater than 100 for enlargement and numbers less than 100 for downsizing. Block 716 converts the scaled X coordinate position, Y coordinate position and size of the text back to ASCII format.

Block 718 then reassembles the text character string by concatenating the token followed by a space, the X position followed by a space, the angle followed by a space, the slant followed by a space, the size followed by a space, the over followed by a space, the INV followed by a space, the justification followed by a space, the font followed by a space, the NCH followed by a space and the color fields to reform the text string. Next, Block 720 copies the next string line of text exactly "as is" and then a return is made to the next line looping portion of the symbol scaling program.

Referring again to FIG. 2, if Block 10 determines that the first character or token is not a "T", the N path is followed and Block 78 is entered. If more lines are to be read, Block 78 transfers control to Block 4, if not Block 78 transfers control to Block 80 which writes the file and the symbol scaling program returns control to the program calling it.

Figure 8:
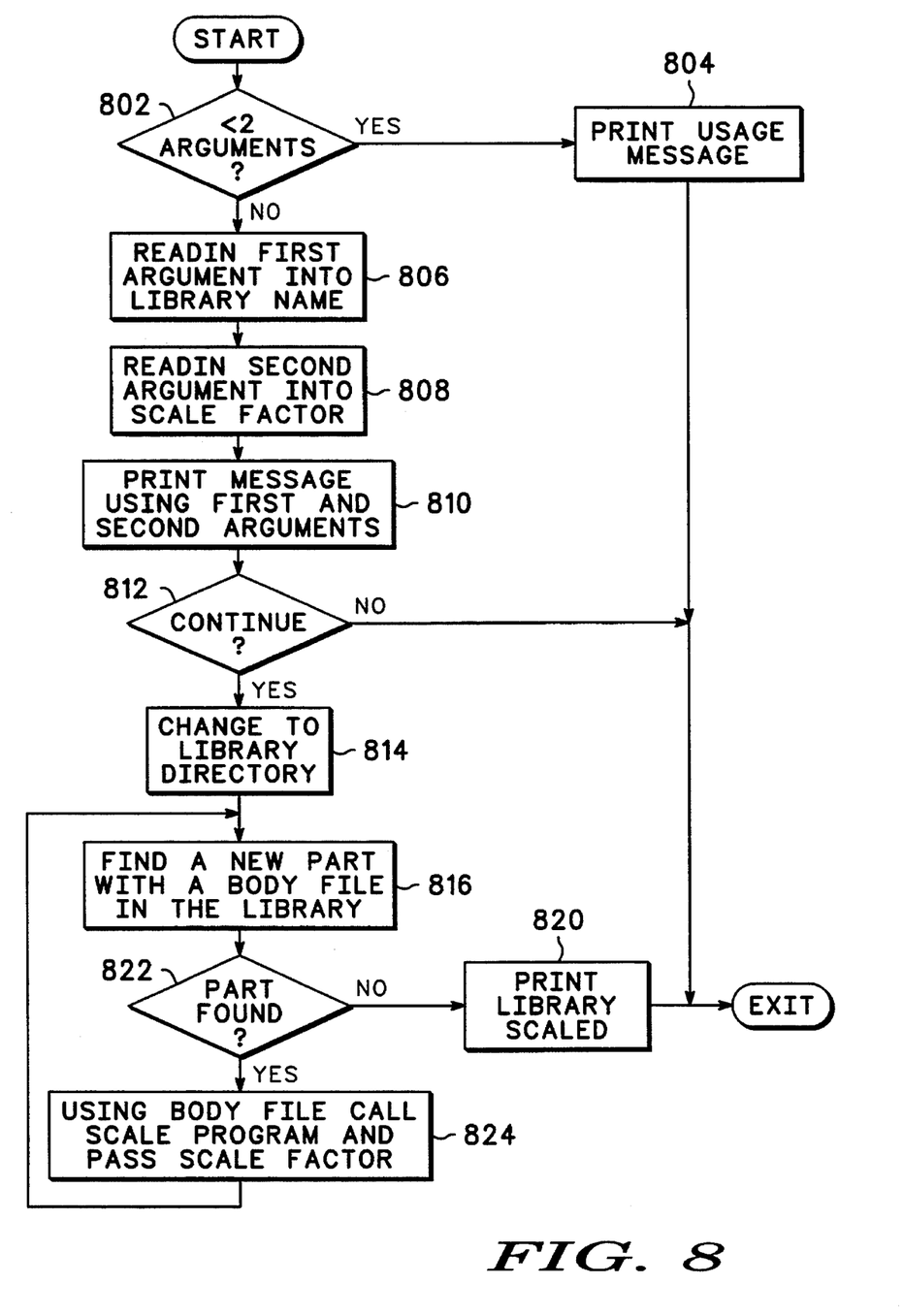
FIG. 8 is a flow chart of a method for scaling symbols of an entire library in accordance with the present invention.

Referring to FIG. 8, a full diagram for a library scale method is shown. This method takes into account the scaling of a complete library or collection of symbols representing electronic devices or parts. This method will scale a complete library of electronic devices or parts. Call to this method is made by calling the scale library method (scale_lib) followed by two arguments. The first argument is the name of the library to be scaled and the second argument is the scaling factor to be applied to each of the electronic device symbols. For example, a scaling factor of 10 indicates a 10% of the current size to be produced; a scaling factor of 100 indicates that the same size is to be produced, that is, no change; and a 500 scaling factor indicates that the electronics device symbols are to be made 5 times larger than the current size.

When the method for scaling the library is called, the start Block is entered and 802 first checks to insure that there are two arguments associated with the call of this method. If there are less than two arguments, Block 802 transfers control via the Y-path to Block 804. Block 804 prints a usage error message indicating that an error has been generated due to lack of the proper number of arguments for the scale_lib method to perform. Block 804 then exits and returns to the calling program.

If there are two arguments in the call to the scale_lib method, Block 802 transfers control to Block 806 via the N-path. Block 806 reads the first argument, which is the library name. Block 808 reads in the second argument, which is the scale factor to be applied to each of the electronic device symbols of the library. Block 810 prints a message indicating what the first and second arguments of the call to the scale library method are for a user to observe and asks the use whether the process should continue? If the user does not intervene, the program will continue by transferring control from Block 812 to 814. If the user has intervened and decided to discontinue the method, Block 812 transfers control via the N-path to exit and return to the calling software.

Block 814 changes the library directory to the library selected by the first argument of the input. Block 816 finds a new electronic part symbol including a body file in the selected library. If an electronic device symbol or part which has not previously been scaled is found, Block 822 transfers control to Block 824. If no new parts are found in the library, Block 822 transfers control to Block 820 via the N-path. Block 820 prints a message to the user indicating that the selected library has been scaled and exits returning to the program calling the scale_lib method. If an unscaled device symbol is found, Block 822 transfers control to Block 824. Block 824 calls the scaling program and transmits the scaling factor to the scale program. The scaling factor program is initiated at the start block in FIG. 2 and includes the flow diagrams of FIG. 2 through FIG. 7 inclusive. When the scale_lib method has scaled a particular electronic device symbol body file, control is returned to Block 824. Block 824 then transfers control to Block 816 and the steps of Blocks 816, 822 and 824 are repeated or iterated until all the part body files in the selected library have been scaled. The last Block, Block 820, prints the message "library" scaled and exits.

FIG. 9 depicts four electronic device or part symbols. Element 910 is a 2N4351 field effect transistor. Item 920 is a 2N6603 NPN transistor. Item 930 is a LP2951 integrated circuit and item 940 is a MAX622 integrated circuit. FIG. 10 depicts each of these electronic device symbols of FIG. 9 scaled to 25% of the full size shown in FIG. 9. That is, item 1010 of FIG. 10 corresponds to item 910 of FIG. 9. Item 1020 corresponds to a 25% scale version of item 920. Item 1030 corresponds to item 930 and item 1040 corresponds to item 940. The symbols shown are the actual size of a 25% scale reduction for each of the electronic device symbols of FIG. 9 shown in FIG. 10. The scaling method of FIG. 2 through 8 has operated upon the library file of FIG. 9 and produced a library file of FIG. 10.

As an example of the contents of a typical body file, Table 1 below presents each of the line descriptors for the field effect transistor 2N4351 shown as item 910 in FIG. 9.

TABLE 1

```
C 100 –200 "S\NAC" 113 –239 0 0 32 0 L
X "$PN" "?" 120 –174 0.00 0.00 54 0 0 0 0 0 1 0 74
C 100 200 "D\NAC" 100 220 0 0 32 0 L
X "$PN" "?" 118 127 0.00 0.00 54 0 0 0 0 0 1 0 74
C –200 0 "G\NAC" –200 20 0 0 32 0 R
X "$PN" "?? –180 24 0.00 0.00 54 0 0 0 0 0 1 0 74
C 300 0 "CASE\NAC" 325 0 0 0 40 0 L
X "$ON" "?"250 25 0.00 0.00 54 0 0 0 0 0 1 0 74
L 299 0 182 0 –1 74L 299 –1 299 0 –1 74
L 0 –100 0 –60 –1 0
L 100 –200 100 0 –1 74
L O 100 0 60 –1 0
L –40 –80 –40 80 –1 –
L 0 20 0 –20 –1 0
L 100 0 –1 0 –1 74
L 0 –80 100 –80 –1 0
L 0 80 100 80 –1 0
L 100 80 100 200 –1 0
L –200 0 –40 0 –1 0
L 40 –20 0 0 –1 0
L 40 20 –1 0 –1 74
A 181 0 –13 0.00 359.91 74
A 40 2 141 0.00 359.91 74
P "RCA" "DEF" 121 –289 0.00 0.00 32 0 0 0 0 0 0 0
P "TOL_ON_OFF" "ON" 111 –249 0.00 0.00 32 0 0 0 0 0 0 0
P "IC_VGS" " UNDEF" 111 –209 0.00 0.00 32 0 0 0 0 0 0 0
P "IC_VGS" " UNDEF" 111 –169 0.00 0.00 32 0 0 0 0 0 0 0
P "STATE" "ON" 111 –129 0.00 0.00 32 0 0 0 0 0 0 0
P "PATH" "?" 141 13 0.00 0.00 64 0 0 0 0 0 0 0
P "NAME" "2N4351" 240 92 0.00 0.00 64 0 0 0 0 0 1 0
```

Table 2 depicts the same body file for the electronic device symbol 2N4351 shown as item 1010 in FIG. 10. This symbol has been scaled by 25%. Please note in the first characteristic the connector of Table 1 that the first argument is 100 and the second argument is minus 200. Referring to table 2, the first connector or C characteristic, the first argument has changed from 100 to 25 which represents a scaling of ¼th or 25%. Similarly, the second argument has changed from minus 200 in Table 1 to minus 50 in Table 2. Again, this indicates a scaling of 25% or a reduction of ¼ in size.

TABLE 2

```
C 25 –50 "S\NAC" 28 –59 0 0 8 0 L
X "$PN" "?" 30 –43 0.00 0.00 13 0 0 0 0 0 1 0 74
C 25 50 "D\NAC" 25 55 0 0 8 0 L
X "$PN" "?" 29 31 0.00 0.00 13 0 0 0 0 0 1 0 74
C –50 0 "G\NAC" –50 5 0 0 8 0 R
X "$PN" "?" –45 6 0.00 0.00 13 0 0 0 0 0 1 0 74
C 75 0 "CASE\NAC" 81 0 0 0 10 0 L
X "$PN" "?" 62 0.00 0.00 13 0 0 0 0 0 1 0 74
L 74 0 45 0 –1 74
L 74 0 74 0 –1 74
L 0 –25 0 –15 –1 0
L 25 –50 25 0 –1 74
L 0 25 0 15 –1 0
L –10 –20 –10 20 –1 0
L 0 5 0 –5 –1 0
L 25 0 0 0 –1 74
L 0 –20 25 –20 –1 0
L 0 20 25 20 –1 0
L 25 20 25 50 –1 0
L –50 0 –10 –1 0
L 10 –5 0 0 –1 0
L 10 5 0 0 –1 74
A 45 0 –3 0.00 359.91 74
A 10 0 35 0.00 359.91 74
P "RCA" " DEF" 20 –72 0.00 0.00 8 0 0 0 0 0 0 0
P "TOL_ON_OFF" "ON" 27 –62 0.00 0.00 8 0 0 0 0 0 0 0
P "IC_VDS" "UNDEF" 27 –52 0.00 0.00 8 0 0 0 0 0 0 0
P "IC_VGS" "UNDEF" 27 –42 0.00 0.00 8 0 0 0 0 0 0 0
P "STATE" "ON" 27 –32 0.00 0.00 8 0 0 0 0 0 0 0
P "PATH" "?" 35 3 0.00 0.00 16 0 0 0 0 0 0 0 0
P "NAME" "2N4351" 60 23 0.00 0.00 16 0 0 0 0 0 1 0 0
```

Table 3 shown below depicts the parameters for each of the characteristics making up a body file of an electronic device symbol. Each of the parameters shown for each characteristic are shown separated by commas in the table. No commas are stored in the internal database in the body file or library.

TABLE 3

```
C,x,y,"name",dispx,dispy,bubbleable,[default_state,x2,y2,x3,y3]f,
size,angle,just
X,"name","value",x,y,angle,slant,size,over,inv,just,font,NV,W,
IP,color
P,"name","value",x,y,angle,slant,size,over,inv,just,font,NV,W,
IP,color
M,x1,y1,x2,y2,[pattern],color
L,x1,y1,x2,y2,[pattern],color
A,x,y,radius,start_angle<stop_angle,color
T,x,y,angle,slant,size,over,inv,just,font,,Nch,color,string
```

The "C" token is for a connection characteristic. The "X" token represents the PIN property definition characteristic of an electronic device symbol. The "P" definition represents the body properties of the electronic device symbol. The "M" token represents the parameters for a heavy thickness line; while the token "L" indicates the parameters for a line of regular thickness. The token "A" indicates the parameters for an arc or apparent circle. The token "T" indicates the text to be shown associated with an electronic device symbol.

A method for quickly scaling electronic device symbols disassembles body files into fields associated with each token characteristic, rescales the appropriate parameters requiring resizing and rescaling, and reassembles the scaled body file parameters according to the input provided. Although the Cadence Design Systems Inc. and Valid Logic databases are shown by way of example, the methodology shown herein will be equally applicable to other files associated with electronic device symbols. The particular body files shown above in Table 3 and used as examples throughout this application pertain to the GED concept and concept graphics libraries. Due to the quick selection of certain parameters for sizing, this method operates in seconds in distinction to the prior art methodology requiring minutes or tens of minutes to convert single electronic device symbols to larger or reduced sizes. It is to be noted that once electronic device symbols are made very small, they should not be enlarged because the proportions of the parameter fields may become too small to recovered accurately. In addition, the present method provides for scaling whole libraries of electronic design symbols.

Although the preferred embodiment of the invention has been illustrated, and that form is described in detail, it will be readily apparent to those skilled in the art that various modifications may be made therein without departing from the spirit of the invention or from the scope of the appended claims.

What is claimed is:

1. A method for graphics scaling of electronic circuit device symbols by a computer comprising the steps of:

providing an input file including at least one characteristic of a device symbol;

said characteristic including a plurality of parameters describing the characteristic;

parsing by the computer the plurality of parameters of the input file;

selecting by the computer certain ones of the plurality of parameters;

scaling by the computer the selected certain ones of the plurality of parameters according to a scaling factor; and reassembling by the computer the input file including the at least one characteristic including the plurality of parameters and the scaled certain ones replacing the selected certain ones of the plurality of parameters.

2. A method for graphics scaling of electronic circuit device symbols as claimed in claim 1, wherein there is further included the steps of:

receiving the scaling factor by the computer from an external source; and utilizing the scaling factor to scale the selected certain ones of the plurality of parameters.

3. A method for graphics scaling of electronic circuit device symbols as claimed in claim 1, wherein there is further included the steps of:

said steps of providing the input file including the step of providing a plurality of characteristics of the device symbol; and said step of parsing, including the step of parsing a predefined parameter of said plurality of parameters for each characteristic to obtain a token separator.

4. A method for graphics scaling of electronic circuit device symbols as claimed in claim 3, wherein there is further included the step of first determining an identity of the token separator parsed from each characteristic.

5. A method for graphics scaling of electronic circuit device symbols as claimed in claim 4, wherein there is further included the step of transferring control of the computer to a handler program corresponding to the identity of the token separator of the characteristic.

6. A method for graphics scaling of electronic circuit device symbols as claimed in claim 5, wherein there is further included the steps of:

receiving control of the computer by a connection handler program in response to the step of first determining of a connection token separator;

said step of parsing including the step of parsing X and Y coordinates of a location of a connection for a connection characteristic;

converting values of the X and Y coordinates to integer form; and said step of scaling including the steps of multiplying the values of the X and Y coordinates by the scaling factor and dividing a result of the multiplication by a predefined number.

7. A method for graphics scaling of electronic circuit device symbols as claimed in claim 6 wherein there is further included the steps of:

second determining whether an inversion symbol of the connection characteristic is to be connected to the connection;

parsing X and Y coordinates of the inversion symbol;

converting values of the X and Y coordinates to integer form; and said step of scaling including the steps of multiplying values of the X and Y coordinates of the inversion symbol by the scaling factor and dividing a result by the predefined number.

8. A method for graphics scaling of electronic circuit device symbols as claimed in claim 7 wherein there is further included the steps of:

replacing the values of the X and Y coordinates of the connection of and the values of the X and Y coordinates of the inversion symbol of the characteristic with the scaled values of the connection and of the inversion symbol; and reassembling each of the plurality of parameters of the connection characteristic including the scaled values of the connection and of the inversion symbol.

9. A method for graphics scaling of electronic circuit device symbols as claimed in claim 5, wherein there is further included the steps of:

receiving control of the computer by an input/output PIN property handler program in response to the step of first determining of an input/output PIN token separator;

said step of parsing including the step of parsing X and Y coordinates of a location of the input/output PIN; and parsing a size of the input/output PIN;

converting values of the X and Y coordinates of the input/output PIN and of the size of the input/output PIN to integer form; and said step of scaling including the steps of multiplying the values of the X and Y coordinates of the input/output PIN and of the size of the input/output PIN by the scaling factor and dividing a result of the multiplication by a predefined number.

10. A method for graphics scaling of electronic circuit device symbols as claimed in claim 9, wherein there is further included the steps of:

replacing the values of the X and Y coordinates of the PIN and of the value of the size of the input/output PIN of the characteristic with the scaled values of the PIN and of size of the input/output PIN; and reassembling each of the plurality of parameters of the input/output PIN characteristic including the scaled values of the input/output PIN and of the size of the input/output PIN.

11. A method for graphics scaling of electronic circuit device symbols as claimed in claim 5, wherein there is further included the steps of:

receiving control of the computer by a body property handler program in response to finding a body token by the step of first determining;

said step of parsing, including the step of parsing X and Y coordinates of a location of a body property characteristic of the electronic circuit device symbols;

converting values of the X and Y coordinates to integer form; and said step of scaling including the steps of multiplying the values of the X and Y coordinates by the scaling factor and dividing a result of the multiplication by a predefined number.

12. A method for graphics scaling of a electronic circuit device symbol as claimed in claim 11, wherein there is further included the steps of:

second determining whether a "verified_by" field indication is present in the body property characteristic;

parsing initials of a verfier and a date of a verification by, if the step of second determining indicates a verification by in the "verified_by" field.

13. A method for graphics scaling of a electronic circuit device symbol as claimed in claim 12, where there is further included the steps of;

replacing the values of the X and Y coordinates of the body property of the body property characteristic with the scaled values of the body property;

inserting the initials and the date of the "verified_by" field, if the "verified_by" field indicates a verification; and reassembling each of the plurality of parameters of the body property characteristic including the scaled values of the body property.

14. A method for graphics scaling of a electronic circuit device symbol as claimed in claim 5, wherein there is further included the steps of:

receiving control of the computer by a line handler program in response to finding a line token separator by the step of first determining;

said step of parsing including the step of parsing X and Y coordinates of a location of a line segment from a line characteristic of the input file;

converting values of each of the X and Y coordinates of the line segment to integer form; and said step of scaling including the steps of multiplying each of the values of the X and Y coordinates of the line segment by the scaling factor and dividing a result of the multiplication by a predefined number.

15. A method for graphics scaling of electronic circuit device symbols as claimed in claim 14, wherein there is further included the steps of:

replacing the values of each of the X and Y coordinates of the line segment with the scaled values of the line segment; and reassembling each of the plurality of parameters of the line characteristic including the scaled values of the line segment.

16. A method for graphics scaling of electronic circuit device symbols as claimed in claim 15, wherein there is further included steps of:

receiving control of the computer by a thick line handler program in response to finding a thick line token separator by step of first determining; and repeating the steps of parsing X and Y coordinates, converting, multiplying, dividing, replacing and reassembling for the plurality of parameters describing a thick line.

17. A method for graphics scaling of a electronic circuit device symbol as claimed in claim 5, wherein there is further included the steps of;

receiving control of the computer by an arc handler program in response to finding an arc token separator by the step of first determining;

said step of parsing including the steps of parsing X and Y coordinates of a location of a center of an arc from an arc characteristic of the input file; and parsing a radius of the arc from an arc characteristic of the input file;

converting values of the X and Y coordinates and the radius to integer form; and said step of scaling including the steps of multiplying the values of the X and Y coordinates by the scale factor and dividing a result of the multiplication by a predefined number; and multiplying the value of the radius by the scaling factor and dividing the result of the multiplication by the predefined number.

18. A method for graphics scaling of electronic circuit device symbols as claimed in claim 17, wherein there is further included the steps of;

replacing the values of the X and Y coordinates of the center of the arc and the value of the radius of the arc with the scaled values of the X and Y coordinates of the center of the arc and radius of the arc; and reassembling each of the plurality of parameters of the arc characteristic including the scaled values of the X and Y coordinates of the center and radius of the arc.

19. A method for graphics scaling of electronic circuit device symbols as claimed in claim 5, wherein there is further included the steps of;

receiving control of the computer by a text string handler program in response to finding a text string token separator by the step of first determining;

said step of parsing, including the steps of parsing X and Y coordinates of a location of the beginning of a text string; and parsing a size of the text string;

converting values of the X and Y coordinates and the size of the text string to integer form; and said step of scaling, including the steps of multiplying the values of the X and Y coordinates by the scaling factor and dividing a result of the multiplication by predefined number; and multiplying the value of the size of the text string by the scaling factor and dividing a result of the multiplication by the predefined number.

20. A method for graphics scaling of electronic circuit device symbols as claimed in claim 19, wherein there is further included the steps of;

replacing the values of the X and Y coordinates of the beginning of the text string and the value of the size of the text string with the scaled values of the X and Y coordinates and size of the text string; and reassembling each of the plurality of parameters of the text string including the scaled values of the X and Y coordinates of the beginning of the text string and the size of the text string.

21. A method for graphics scaling of electronic circuit device symbols of a graphics library by a computer comprising the steps of;

receiving by the computer a library name and a scaling factor from a user;

finding an unscaled electronic circuit device symbol in a library of the library name;

reading an input file information, including at least one characteristic of the electronic circuit device symbol;

said characteristic including a plurality of parameters describing the characteristic;

parsing by the computer plurality of parameters of said input file information;

selecting by the computer certain ones of the plurality of parameters;

scaling by the computer the selected certain ones of the plurality of parameters according to a scaling factor; and reassembling by the computer the input file including the at least one characteristic including the plurality of parameters and the scaled certain ones replacing the selected certain ones of the plurality of parameters;

repeating the steps of reading, parsing, selecting, scaling and reassembling until each of the device symbols of the library is scaled.

* * * * *